(No Model.)
J. P. BURNHAM.
MACHINE FOR FORMING INTERFITTING TONGUES AND GROOVES ON OPPOSITE ENDS OF FLOORING BOARDS.
No. 569,610. Patented Oct. 20, 1896.
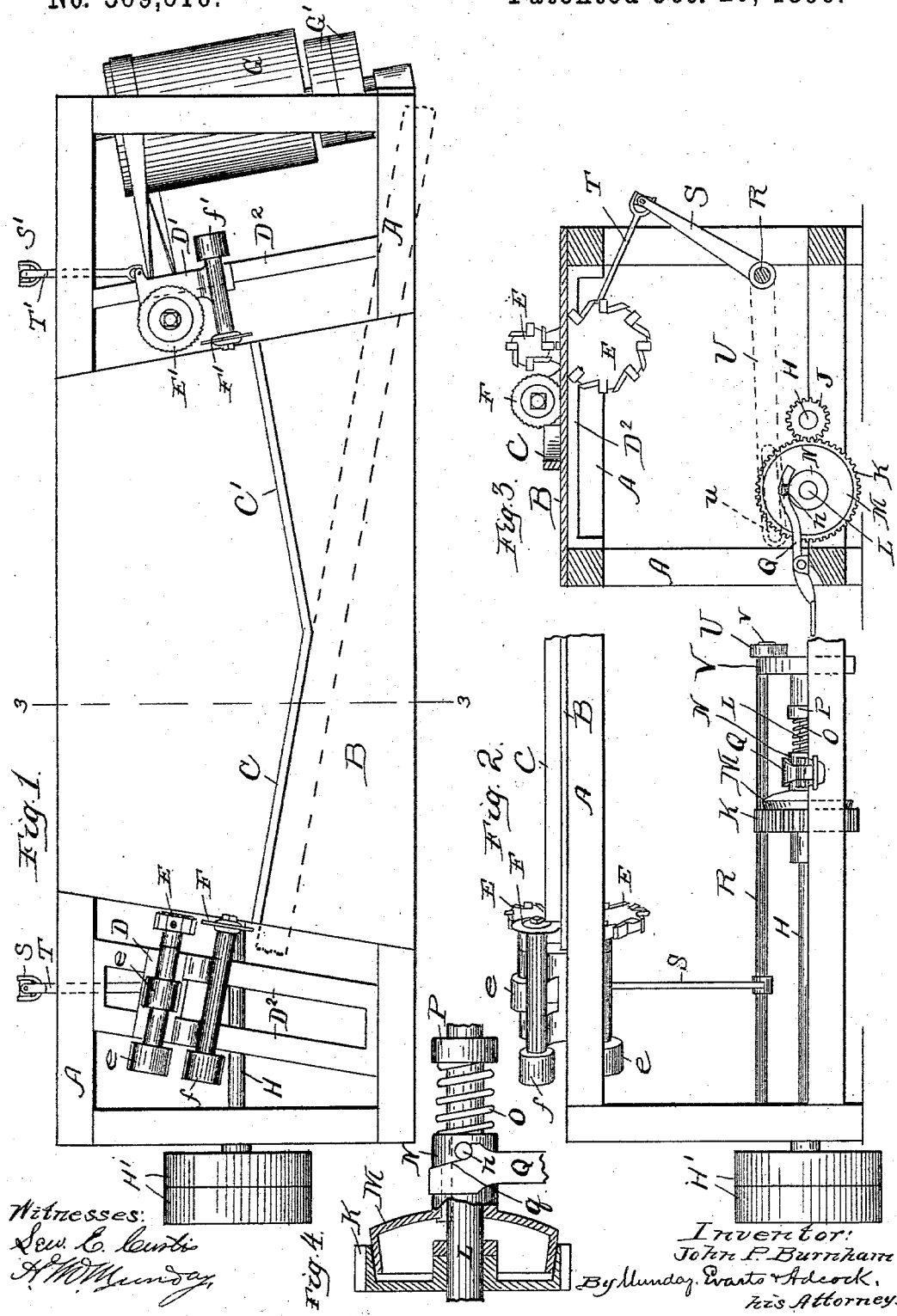

UNITED STATES PATENT OFFICE.

JOHN P. BURNHAM, OF CHICAGO, ILLINOIS, ASSIGNOR TO THOMAS WILCE, OF SAME PLACE.

MACHINE FOR FORMING INTERFITTING TONGUES AND GROOVES ON OPPOSITE ENDS OF FLOORING-BOARDS.

SPECIFICATION forming part of Letters Patent No. 569,610, dated October 20, 1896.

Application filed November 15, 1893. Serial No. 490,977. (No model.)

*To all whom it may concern:*

Be it known that I, JOHN P. BURNHAM, a citizen of the United States, residing in Chicago, in the county of Cook and State of Illinois, have invented a new and useful Improvement in Machines for Forming Interfitting Tongues and Grooves on the Opposite Ends of Flooring-Boards, of which the following is a specification.

My invention relates to machines for forming interfitting tongues and grooves in the ends of flooring boards or strips; and it consists in the novel combination of parts and devices herein shown and described, and more particularly pointed out in the claims.

In the accompanying drawings, forming part of this specification, and in which similar letters of reference indicate like parts, Figure 1 is a plan view of a machine embodying my invention. Fig. 2 is a partial side elevation of the same. Fig. 3 is a vertical cross-section on the line 3 3 of Fig. 1, and Fig. 4 is a detail view of the clutch mechanism.

Referring to the drawings, A is the framework of the machine. B is the table for supporting the board which is to be tongued and grooved at its ends.

C C' is the guide or side stop against which the board is to be held when operated upon and which positions the same. The purpose of making the guide C C' in two parts standing at an obtuse angle from each other is in order that when one of the ends of the board is being operated upon the other end will lie clear.

D and D' are two reciprocating cross-heads adapted to move on the ways $D^2 D^2$, which ways are set at an angle to the table to correspond to the guides C C'. Upon the cross-head D is mounted the pair of tonguing-cutters E E and also the cut-off saw F. Upon the cross-head D' is mounted the grooving-saw E', preferably a wabble-saw, for forming the groove in the end of the board, and this cross-head carries also a cut-off saw F'.

In use the tongue-cutters E E are driven by belts on the pulleys $e\ e$, and the saws F F' by belts on the pulleys $f f'$, extending from a counter-shaft placed at such distance above that the belt connection will not interfere with the transverse movement across the table of the cross-heads and the apparatus mounted thereon. The wabble-saw E' is driven by a belt from the drum G, driven in turn by pulleys G' from a counter-shaft above. The countershafting is not shown in the drawings.

H is a shaft driven by the pulleys H' and extending lengthwise of the machine. This shaft carries a pinion J, which meshes with a loose cog-wheel K on the parallel shaft L. The cog-wheel K is made to form part of a friction-clutch, of which the cone M is the counterpart.

N is the hub on the friction-cone, O a coiled spring, and P a stop for the same on the shaft L. The normal action of the spring is to force and hold the two parts of the clutch together. The end of a pivoted foot-lever Q rests upon the hub N and against a pin $n$ in said hub. A bevel-face $q$ upon the end of the foot-lever Q serves to throw the pin and its attached hub to one side and disengage the clutch automatically when said foot-lever is at rest; but when the foot is put upon the lever and the end raised out of contact with the hub the spring O will close the clutch and cause the shaft L to revolve with the cog-wheel K.

At the rear side of the machine is a rock-shaft R, carrying arms S S', connected by swivel-jointed links T T' to the cross-heads D D', respectively, and from said rock-shaft extends a slotted arm U, (shown in dotted lines at Fig. 3,) the slot $u$ of which engages a crank-pin $v$ on the crank-wheel V, (see Fig. 2,) carried on the shaft L.

The machine being under motion the operator places the board to be treated upon the table against the guide, as, for example, in the position shown in dotted lines at Fig. 1, where it is shown in such position as to have one of its ends tongued. He then with his foot depresses the clutch-treadle, which releases the hub of the clutch-cone and permits the spring to set the two parts of the clutch together, causing the shaft L to make one complete revolution. The arm U, arms S S', and links T T' now cause the cross-heads D D' to traverse their ways, and the saw F is brought into contact with the end of the board, which it squares off truly, and is immediately followed by the tonguing-cutters E E, which form the tongue, whereupon the cross-head is carried back to its original position. The operation of squaring and tonguing that end of the board having been completed, the workman now slips the board along and swings it against the other part of the guide C'. He then depresses the clutch-lever, the cross-heads again advance, the saw F' squares the other end of the board, and the wabble-saw E' forms the groove in that end, when the cross-heads again return and are ready to operate upon a new board.

The construction and arrangement of the machine are such, as will be seen, that the operation of tonguing and grooving opposite ends of either long or short stuff may be rapidly carried on.

I claim—

1. The machine for forming a tongue on one end and a groove at the other end of variable-length flooring-boards, comprising in combination the following instrumentalities: (1) a support for the board (2) a rotary grooving mechanism rotating parallel with the plane of the board-support, (3) a rotary tonguing mechanism rotating at right angles with the plane of the board-support, (4) a guide for the side of the board extending at right angles to the line of the cut of said tonguing mechanism and being toward the grooving mechanism unobstructed and open so that a board longer than the distance between the tonguing mechanism and the grooving mechanism may be set against said guide, said guide also extending from the grooving mechanism in a line at right angles to the cut of the grooving mechanism and being toward the tonguing mechanism in similar manner unobstructed, (5) a saw for cutting off and squaring one end of the board preparatory to grooving the same, and a second saw for cutting off and squaring the other end of the board preparatory to tonguing the same, said mechanisms for grooving and tonguing and sawing the board, and said devices for supporting and guiding the board being relatively movable, the one in respect to the other, substantially as specified.

2. In a machine for forming interfitting tongues and grooves on the opposite ends of flooring boards or strips of varying lengths the combination with a table B furnished with a guide extending longitudinally of the table for the side edge of the board to fit against while being operated upon first at one end and then at the other, of a transversely-reciprocating slide or cross-head mounted on said table at one end of said guide, and provided with a cut-off saw and tonguing mechanism for first cutting off or squaring one end of the board and forming a tongue thereon, and a second transversely-reciprocating slide or cross-head mounted on said table at the other end of said guide and provided with a cut-off saw and a grooving mechanism for cutting off or squaring the other end of the board and forming a groove therein, the continuously-operated shaft H and the clutch-operating mechanism for reciprocating the cross-heads at the will of the operator, said parts being arranged and coöperating together to first operate upon one end of the board and then upon the other end of the board, substantially as specified.

3. In a machine for forming interfitting tongues and grooves on the opposite ends of flooring boards or strips, the combination of table B, guides C C' arranged at an angle to each other on said table, transversely-reciprocating cross-heads D D' mounted on said table in guideways, one at right angles to each of said guides C C', and one of said cross-heads being provided with and carrying a continuously-operated tonguing mechanism, and the other of said cross-heads being provided with and carrying a continuously-operated grooving mechanism, a continuously-rotated shaft H, a shaft L geared to said shaft H by a clutch, said clutch, the counter-shaft R, crank $v$, slotted arm U, arms S S', and connections T T', all arranged and combined substantially as specified.

4. In a machine for forming interfitting tongues and grooves on the opposite ends of flooring boards or strips, the combination of table B, guides C C' arranged at an angle to each other on said table, transversely-reciprocating cross-heads D D' mounted on said table in guideways one at right angles to each of said guides C C', and one of said cross-heads being provided with and carrying a continuously-operated tonguing mechanism, and the other of said cross-heads being provided with and carrying a continuously-operated grooving mechanism, a continuously-rotated shaft H, a shaft L geared to said shaft H by a clutch, said clutch, the counter-shaft R, crank $v$, slotted arm U, arms S S', and connections T T', each of said cross-heads also being provided with and carrying a cut-off saw, substantially as specified.

5. In a machine for forming interfitting tongues and grooves on the opposite ends of flooring boards or strips, the combination of a table B provided with two guides C C' arranged at an obtuse angle to each other on said table, and two reciprocating slides or cross-heads mounted in guideways on said table, one at right angles to each of said guides C C' and at the opposite ends of said guides, one of said slides being provided with and carrying a cut-off saw and a tonguing mechanism arranged and adapted to form a tongue at one end of the board, and the other of said slides being provided with a cut-off saw and a grooving mechanism arranged and adapted to form a groove in the opposite end of the board, the obtuse angle of said guides permitting the free end of the board to clear one of said slides and mechanisms while the other end of said board is being operated upon, substantially as specified.

JOHN P. BURNHAM.

Witnesses:
H. M. MUNDAY,
EMMA HACK.